United States Patent Office 2,978,310
Patented Apr. 4, 1961

2,978,310
METHOD OF PRODUCING A MEANS FOR INFLUENCING PLANT GROWTH

Jasper Daams and Harmannus Koopman, Weesp, and Cornelis Johannes Schoot, Eindhoven, Netherlands, assignors to North American Philips Company, Inc., New York, N.Y., a corporation of Delaware No Drawing. Filed Oct. 1, 1958, Ser. No. 764,509

Claims priority, application Netherlands Oct. 2, 1957

7 Claims. (Cl. 71—2.3)

It is known that various chemical compounds are capable of influencing plant growth.

They may be classified as natural growth stimultors, also termed plant hormones (auxins) such as auxin-$a$ and -$b$ and indolyl acetic acid, which are present in plants and influence cell elongation.

Further, there are many synthetic and natural compounds, not present in plants, which influence the growth of plants, primarily artificial manures which stimulate plant growth as a whole, and compositions which are used in much smaller quantities than artificial manures, influence the growth and yield rather local effects.

Thus, for example, 3-indolylbutyric acid stimulates root formation, 1-naphthylacetic acid is capable of preventing apples from falling down prematurely, 2,4-dichloro-phenoxy-acetic acid stimulates artificial fructification of tomatoes, inhibits budding of a number of plants and germination, for example of potatoes, influences the formation of flowers of pine apples, prevents pollen formation of Ambrosia spp. and greatly slows the growth of dicotyledons.

The sensitivity of plants to given compounds varies from one species to another and discrepancies occur even in varieties of one species. Not all species are sensitive to the aforesaid synthetic compounds.

Further it is known, that compounds having a hormone-like effect are growth-retarding when administered in large doses (herbicidal effect).

Substantially all of the natural and synthetic growth stimulators involve a non-proportional plant growth. The effect is commonly local, as in many of the aforesaid cases, or such as to disturb the rate of transport within plants. The latter occurs when using herbicides such as, for example, 2,4-dichlorophenoxyacetic acid.

Means have now been found by which a proportional plant growth is promoted. Their use increases the rate of growth, while the "fresh weight" and the content of dry substance of the plant increase substantially to the same degree. Local effects, for example, deformation of leaves or stems, do not or substantially not occur. The effect exerted on the plant growth by the means produced in accordance with the present invention is considered to be quite novel. The means promotes the growth of quite a number of different plant species. It greatly stimulates the growth of young plants, in particular of plants, consumed after a comparatively short growth period, for example specific leaf vegetables such as lettuce, spinach and endive.

The present invention relates to a method of producing compositions for influencing plant growth in particular that of young plants, and is characterized in that a compound of the general formula

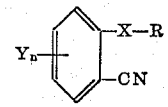

in which R represents hydrogen, a —$CH_3$, —$C_2H_5$, —$CO.CH_3$ or —$CH_2.COOH$ group, X represents an oxygen or sulphur atom, Y represents hydrogen, halogen, such as clorine, bormine, fluorine or iodine atoms, alkyl groups with 1 to 4 carbon atoms, alkoxy groups with 1 to 4 carbon atoms or amino- or acetylamino groups and $n=0$, 1 or 2, is mixed with solid and/or liquid carrier substances.

The invention is of particular importance for producing plant growth influencing compositions containing as effective constituents compounds in which R represents a methyl group. This applies in particular to compounds in which X represents an oxygen atom, and further to compounds in which Y stands for a chlorine atom or a methyl group. In particular, 2-methoxy-benzonitrile is of importance as an effective constituent.

Researches leading to the invention have revealed that the growth promoting effect is due to a systemic effect. This effect is obtained by dispersing the effective compound over the overground parts of the plants or over the soil in which the plants are growing. In the last-mentioned case the compound should be mixed with the surface layer of the soil. This may for example, be effected by distributing the means finely divided over the soil around the plants and this in a water-dispersible form or in solution so as to be conveyed for example by water, to the upper layers of the soil.

Table I conveys some idea of the growth promoting effect of a number of compounds. In this table, the effect on the growth of common oats (Avena sativa) is stated.

The earth of a number of pots, each containing 15 freshly germinated plants of common oats approximately 10 cm. tall (Avena sativa), was sprayed with an aqueous suspension of the active compound. In this manner a quantity of 30 mg. suspended in 30 cc. of water was administered per pot, this corresponding to a dose of 48 kg. per hectare. The tests were made in threefold. After 10 days the "fresh weight" of the overground constituents of the plants was determined per pot and expressed as a percentage of the "fresh weight" of untreated plants of the same age.

TABLE I

| Effective compound | "Fresh weight" overground parts of treated plants relative to that of untreated plants of same age (in percent) |
|---|---|
| 2-OCH₃, 1-CN benzene | 174 |
| 2-SCH₃, 1-CN benzene | 121 |
| 4-Cl, 2-OCH₃, 1-CN benzene | 140 |
| 5-Cl, 2-OCH₃, 1-CN benzene | 124 |
| 2,6-di-OCH₃, 1-CN benzene | 119 |
| 5-CH₃, 2-OCH₃, 1-CN benzene | 136 |
| 3-NH₂, 2-OCH₃, 1-CN benzene | 119 |
| 3-NH-CO.CH₃, 2-OCH₃, 1-CN benzene | 114 |
| 5-NH₂, 2-OCH₃, 1-CN benzene | 119 |
| 5-NH-CO.CH₃, 2-OCH₃, 1-CN benzene | 114 |
| 2-OH, 1-CN benzene | 115 |
| 2-O.CO.CH₃, 1-CN benzene | 122 |

From Table I it is seen that notably 4-chloro-, 5-chloro- and 5-methyl-methoxybenzonitrile and, in particular, 2-methoxybenzonitrile have a strong growth-promoting effect.

This effect of 2-methoxybenzonitrile has further been tested by administering different doses to a number of other plants: wheat, barley, maize, dwarf beans and tomatoes. Also common oats were incorporated in this series. The earth of a number of pots containing per pot 15 plants of oats, wheat, barley and maize, and per pot one plant of dwarf beans and tomatoes approximately 10 cm. tall, was sprayed with an aqueous dispersion of the effective compound in quantities of 1, 3, 10, 30 and 100 mg. respectively per pot, corresponding to quantities of 1.6, 4.8, 16, 48 and 160 kg. respectively per hectare. The tests were executed in threefold, those for tomatoes in sixfold. After ten days the "fresh weight" of the overground parts of the plants was determined and expressed as a percentage relative to that of untreated plants of the same age. With tomatoes the "fresh weight" was determined after 21 days. In the case of common oats the "dry weight" was also determined and compared with that of untreated plants of the same age. (The "dry weight" was determined by drying the overground constituents to constant weight at 102° C.; the term "fresh weight" is to be understood to mean the weight of the freshly cut overground parts of the plants.)

The results of these tests are found in Table II.

TABLE II

*The influence exerted by 2-methoxybenzonitrile on plant growth*

| Dose in Kg. per hectare | 1.6 | 4.8 | 16 | 48 | 160 |
|---|---|---|---|---|---|
| oats ("fresh weight") | 137 | 166 | 153 | 174 | 84 |
| oats ("dry weight") | 130 | 154 | 133 | 132 | 66 |
| maize | 135 | 146 | 132 | 139 | 66 |
| barley | 111 | 126 | 128 | 148 | 40 |
| wheat | 126 | 135 | 130 | 140 | 130 |
| dwarf beans | 114 | 150 | 115 | 66 | 46 |
| tomatoes | 144 | 191 | 109 | 92 | ------ |

From Table II it is seen that the growth of all the test plants is greatly promoted. In several cases growth stimulation is considerable, even up to 50% to 90%. Further it is seen that the effect is influenced by the dosage. Even a very low dosage yields a considerable growth stimulation. A large dose slows the growth, which effect is also noticeable in the case of natural growth stimulators. It will be evident that quantities of 1 to 10 kg. per hectare yield a considerable growth-stimulating effect. Since higher doses may cause damage to overground parts of plants, quantities of 1 to 10 kg. per hectare and preferably 5 kg. per hectare, will be administered in practice. In general doses up to approximately 10 kg. per hectare do not or substantially not damage overground parts of plants.

The effect that administering the effective compounds to overground parts of plants also yields considerable growth stimulation was manifest in tests on freshly germinated peas. The overground parts of the peas were sprayed with aqueous dispersions containing 0.1%, 0.3% and 1% of 2-methoxybenzonitrile respectively. The administered quantities correspond to 1.3 kg. and 10 kg. per hectare respectively. After 10 days the "fresh weight" of the treated plants was determined and expressed as a percentage relative to that of untreated plants of the same age. The results are listed in Table III.

TABLE III

| Effective constituent in Kg. per hectare | "fresh weight" of overground parts of treated plants relative to that of untreated plants of the same age (as a percentage) |
|---|---|
| 1 | 111 |
| 3 | 160 |
| 10 | 140 |

The use of the means according to the invention may lead to better harvest results and further to speeding up the ripening of, say, maize by stimulated growth. The use of the means obtained by the method according to the invention is of particular importance for promoting the growth of young plants. It permits, in particular, the growth of vegetables to be stimulated and notably that of leaf vegetables such as lettuce, spinach and endive so that these vegetables can be earlier on the market in the spring and green houses can be used more intensively.

The active compounds are adapted to be worked up in many different ways to preparations ready for use.

Possible forms of working up are:

(a) Water miscible oils preferably containing approximately 25% of active constituent, 5% to 10% of ionic or non-ionic emulsifier or mixtures thereof, inert solvents (in particular aromatic hydrocarbons, such as benzene, toluene and notably xylene), aliphatic or alicyclic ketones such as acetone, methylethylketone and cyclohexanone, aliphatic or alicyclic alcohols such as ethanol, glycol, glycerol and cyclohexanol or mixtures of two or more of these solvents. It is particularly advantageous to use a mixture of 40 parts of xylene and 25 parts of a refined paraffin oil. This applies in particular to a miscible oil made up of 25 parts of active constituent, 10 parts of an ionic or non-ionic emulsifier, 40 parts of xylene and 25 parts of refined paraffin oil, for example, spindle oil.

(b) Wettable powders containing 25% to 80%, for example 50%, of active substance together with wetting agents such as fatty alcoholsulphates or alkylarylsulphonates and in addition dispersing agents such as lignin sulphonates and carriers such as kaolin, chalk, pipeclay, dolomite and attapulgite.

(c) Dusts with 1% to 20%, say 5% of active substance to a mixture of kieselguhr and magnesium marlstone and further, if desired, a wetting agent;

(d) Solutions of the active substance in organic solvents such as aromatic hydrocarbons, for example benzene, toluene or xylene or aliphatic or aromatic ketones such as acetone, methylethylketone or cyclohexanone or mixtures of two or more of these solvents.

The compositions entering into account are substantially all compounds known per se. They are prepared by diazotization of the corresponding amino-compounds and by subsequently converting the produced diazonium compound into the nitriles by the method of Sandmeyer, for example with potassium cuprocyanide.

What is claimed is:

1. A method of uniformly increasing the growth of a plant comprising the step of treating said plant and the soil in which said plant is growing with from about 1 kg. to 10 kg. per hectare of a compound corresponding to the general formula

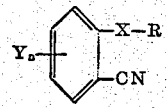

wherein R is a radical selected from the group consisting of $CH_3$, $C_2H_5$ and

radicals, X is an atom selected from the group consisting of oxygen and sulfur atoms, Y is a substituent selected from the group consisting of hydrogen, chlorine, bromine, fluorine and iodine atoms, alkyl radicals containing from 1 to 4 carbon atoms, alkoxy radicals containing from 1 to 4 carbon atoms, the amino radical and the acetylamino radical and $n$ is selected from the group consisting of 0, 1 and 2.

2. A method of uniformly increasing the growth of a plant comprising the step of treating said plant and the soil in which said plant is growing with from about 1 kg. to 10 kg. per hectare of 2-methoxybenzonitrile.

3. A method of uniformly increasing the growth of a plant comprising the step of treating said plant and the soil in which said plant is growing with from about 1 kg. to 10 kg. per hectare of 5-methyl-2-methoxybenzonitrile.

4. A method of uniformly increasing the growth of a plant comprising the step of treating said plant and the soil in which said plant is growing with from about 1 kg. to 10 kg. per hectare of 2-methoxy-5-chlorobenzonitrile.

5. A method of uniformly increasing the growth of a plant comprising the step of treating said plant and the soil in which said plant is growing with from about 1 kg. to 10 kg. per hectare of 2-methoxy-4-chlorobenzonitrile.

6. The method of claim 1 in which the treatment is carried out by means of a miscible oil containing about 25% by weight of the benzonitrile compound, about 5% to 10% by weight of an emulsifying agent and the remainder at least one organic solvent selected from the group consisting of benzene, toluene, xylene, acetone, methylethylketone, cyclohexanone, ethanol, glycol, glycerol and cyclohexanol.

7. The method of claim 1 in which the treatment is carried out by means of a dust containing from about 1% to 20% of the benzonitrile compound.

References Cited in the file of this patent
UNITED STATES PATENTS

| 2,394,916 | Jones | Feb. 12, 1946 |
| 2,412,510 | Jones | Dec. 10, 1946 |
| 2,472,347 | Sexton | June 7, 1949 |

OTHER REFERENCES

Weintraub et al. in "Botanical Gazette," vol. 113, page 360, March 1952.

Miur et al. in "Chemical Abstracts," vol. 47, 1953, col. 9435(h).

King: U.S. Department of Agriculture, Agricultural Handbook No. 69, issued May 1954, page 52.